June 24, 1941.    J. F. FARMER    2,246,580
END ADJUSTABLE GRILLE
Filed Jan. 29, 1940
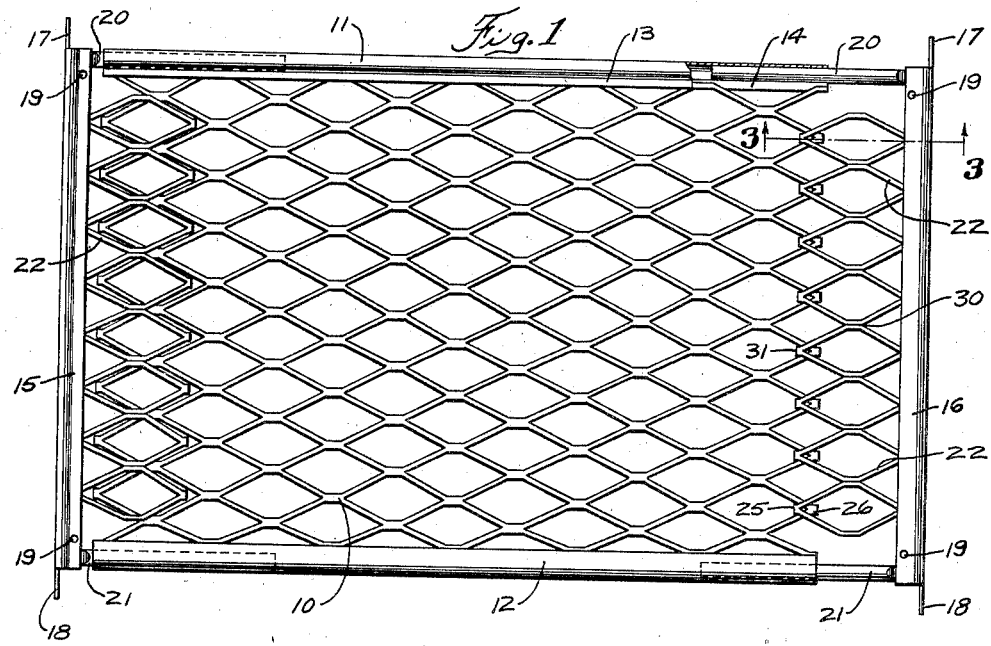
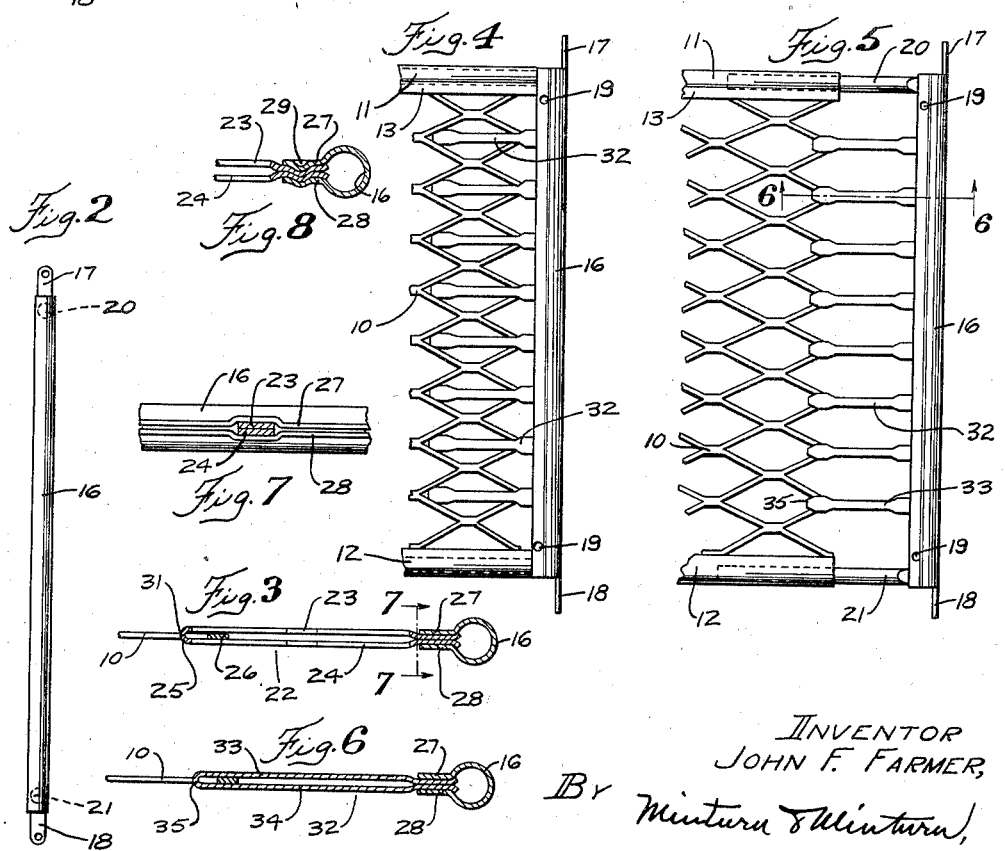
INVENTOR
JOHN F. FARMER,
BY Minturn & Minturn
ATTORNEYS Patented June 24, 1941

2,246,580

UNITED STATES PATENT OFFICE 2,246,580

END ADJUSTABLE GRILLE

John F. Farmer, Indianapolis, Ind.

Application January 29, 1940, Serial No. 316,121

6 Claims. (Cl. 20—71)

This invention relates to an adjustable grille of that type intended for use on windows or doors or the like. In order to prevent having to carry an exceedingly large number of varying widths of grilles, it is desirable to make one grille adjustable to a wide range of door or window openings.

The present invention is particularly concerned with the structure permitting this variation in width in a very simple and unique manner permitting low cost production and at the same time giving a high degree of long service together with a very pleasing appearance.

These and other objects and advantages of the invention will become apparent to those skilled in the art in the following description of one particular form of the invention as illustrated in the accompanying drawing, in which Fig. 1 is a side elevation of a grille embodying the invention;

Fig. 2, an end elevation;

Fig. 3, a section on the line 3—3 in Fig. 1;

Fig. 4, a detail in front elevation of an end portion of a grille in modified form in a closed position;

Fig. 5, a similar view but with the grille in an extended position;

Fig. 6, a section on the line 6—6 in Fig. 5;

Fig. 7, a section on the line 7—7 in Fig. 3; and

Fig. 8, a detail in modified form in section similar to that in Fig. 3.

Like characters of reference indicate like parts throughout the several views in the drawing.

The grille filler 10 may consist of any suitable form of open fabricated material such as woven wire or preferably a rigid expanded metal as indicated in Fig. 1 wherein the filler 10 consists of an open diamond mesh expanded metal forming an integral member without loose joints or connections between the adjacent apices.

In any event whether the customary wire or such metal be employed, the top and bottom margins thereof are secured to top and bottom rails 11 and 12 respectively. In the present form, these rails 11 and 12 have a major circular cross section produced by forming sheet metal in that shape and having terminal flanges 13 and 14, Fig. 1, spaced apart one from the other in parallel relation to receive the marginal part of the filler 10 therebetween. This marginal portion of the filler 10 is secured in each instance to the respective rail 11 and 12 by any suitable means either by deforming the flanges to grip those marginal portions or preferably by welding which is highly suitable to the type of filler 10 indicated in the drawing.

Vertical end rails 15 and 16 are provided to have preferably, although not necessarily so, the same shape as that of the rails 11 and 12. Each of these rails is provided with upper and lower attaching tongues 17 and 18 for positioning and maintaining the finished grille on the door or window as the case may be. Further, securing means is provided in the nature of holes 19 passing laterally through these end rails to receive screws or nails or some suitable attaching means as the situation may require, particularly where the end tongues 17 and 18 would not be employed. Each end rail 15 and 16 is provided with an upper and lower slide rod 20 and 21 respectively preferably rigidly united by their outer ends to the end rail. This, of course, can be accomplished by welding as one particular means for fixing the rods in position. The diameters of these rods 20 and 21 are made to be such that they may enter into the circular parts of the top and bottom rails 11 and 12 in a free sliding manner without any appreciable clearance therearound. Thus the end rails 15 and 16 may be pulled outwardly or pushed inwardly in relation to the ends of the top and bottom rails 11 and 12. In order to limit the distance to which the end rails may be extended, and further to provide means for filling in the space that would be left between the end of the filler 10 and the extended end rails, I provide a plurality of links 22. These links may assume a number of shapes, being shown in Fig. 1 as conforming to the diamond-shaped pattern of the filler 10. In Figs. 4 and 5, the filler assumes a bar shape.

In any event, these links have their outer ends secured respectively to the end rails 15 and 16 and their inner ends hooked over through openings in the filler 10 so that these inner ends will engage with the filler 10 to limit the extension of the end bars. Further these links must be so formed that they will permit the end rails to be pushed inwardly, such for example as the rail 15. The rail 16 is shown in the extended position. The form of the link 22, shown in Figs. 1 and 3, consists of a pair of diamond-shaped members 23 and 24 folded at 25 through an adjacent opening in each case in the filler 10, the members 23 and 24 being identical in shape and dimensions so that when viewed from the side, as in Fig. 1, and the end rail is pulled out as indicated by the position of rail 16, the folded part between the two members 23 and 24 will form a stop against the junction 26 in the filler 10. The outer ends of these members 23 and 24 are inserted between the flanges 27 and 28 of the end rail in each case, the end rail 16, Fig. 3. These ends of the links may be engaged between these rail flanges 27 and 28 in any suitable manner, such as by spot welding as the case would be in Fig. 3; bending the ends of the tongues 23 and 24 around, one from the other within the circular opening in the end rail and then deforming the flanges 27 and 28 on either side of the member ends as in Fig. 7; or as in Fig. 8, simply using a punch press or the like to press an indentation 29 to deform the metal in each of the members thereunder.

While the diamond-shaped links 22 may be individual members dividing one from the other along contacting lines 30, Fig. 1, these links may be made out of two pieces of metal, one for each side, one piece joined to the other along a dividing line 31, Fig. 3, by welding. In this case there would be no dividing lines 30 between adjacent links but there will be an integral connection therebetween.

In the form illustrated in Figs. 4–6, separate links 32 may be employed consisting of identical front and rear members 33 and 34, Fig. 6, folded one over the other by the fold 35, one link each slipped through adjacent end openings in the filler 19 and then have the free ends of the two side members 33 and 34 brought between the flanges 27 and 28 of the end rail, the rail 16 in the present instance. These ends may be engaged in the same manner as suggested for engaging the ends of the links 22. As above indicated, Fig. 4 represents the end rail 16 in the retracted or closed position to give the minimum or lateral length of the grille wherein Fig. 5 indicates the end rail 16 shifted to its maximum extended position as limited by the connecting links 32.

While I have herein shown and described my invention in the one best form as is now known to me, it is obvious that mechanical changes may be incorporated including the particular shape of the connecting links and the like, the method of uniting the various members, etc., all without departing from the spirit of the invention and I, therefore, do not desire to be limited to that precise form beyond the limitations as may be imposed by the following claims.

I claim:

1. In an adjustable grille, top and bottom rails, a filler fixed in dimensions and having a plurality of openings at least at each end, said filler being engaged along its top and bottom edges in a fixed manner by said top and bottom rails, a rail at each end of said filler, guide means attached to said end rails and shiftably engaging said top and bottom rails, and connecting links comprising overlapped spaced apart members engaging with said end rails fixed as to vertical travel therealong to be shifted therewith and slidingly engaging with said filler transversely through said openings to travel horizontally within the limits of the openings, a transverse member carried by at least a part of said connecting links to extend transversely through said openings to form limiting stops by selective contact with the ends of the openings, whereby said end rails may be shifted to and from said filler within the range determined by the lengths of said openings.

2. In an adjustable grille, top and bottom rails, a filler fixed in dimensions and having a plurality of openings at least at each end, said filler being engaged along its top and bottom edges in a fixed manner by said top and bottom rails, a rail at each end of said filler, guide means attached to said end rails and shiftably engaging said top and bottom rails, and connecting links comprising overlapped spaced apart members engaging with said end rails fixed as to vertical travel therealong to be shifted therewith and slidingly engaging with said filler transversely through said openings to travel horizontally within the limits of the openings, a transverse member carried by at least a part of said connecting links to extend transversely through said openings to form limiting stops by selective contact with the ends of the openings, whereby said end rails may be shifted to and from said filler within the range determined by the lengths of said openings, said guide means comprising members fixed by their ends to the top and bottom ends of said end rails and telescoping with said top and bottom rails.

3. In an adjustable grille, top and bottom rails, a filler fixed in dimensions and having a plurality of openings at least at each end, said filler being engaged along its top and bottom edges in a fixed manner by said top and bottom rails, a rail at each end of said filler, guide means attached to said end rails and shiftably engaging said top and bottom rails, and connecting links engaging with said end rails to be shifted therewith and slidingly engaging with said filler through said openings, whereby said end rails may be shifted to and from said filler within the range determined by the lengths of said openings, said connecting links comprising overlapping spaced apart members joined through said openings and extending on front and back sides of the filler to their engagement with the end rails.

4. In an adjustable grille, top and bottom rails, a filler fixed in dimensions and having a plurality of openings at least at each end, said filler being engaged along its top and bottom edges in a fixed manner by said top and bottom rails, a rail at each end of said filler, guide means attached to said end rails and shiftably engaging said top and bottom rails, and connecting links engaging with said end rails to be shifted therewith and slidingly engaging with said filler through said openings, whereby said end rails may be shifted to and from said filler within the range determined by the lengths of said openings, said connecting links comprising overlapping spaced apart members joined through said openings and extending on front and back sides of the filler to their engagement with the end rails, said filler holes being substantially diamond shaped, and said links being essentially diamond shape, the respective members of the links being connected at respective apices to obtain the maximum degree of travel within the limitations of the holes.

5. In an adjustable grille, top and bottom rails, a filler fixed in dimensions and having a plurality of openings at least at each end, said filler being engaged along its top and bottom edges in a fixed manner by said top and bottom rails, a rail at each end of said filler, guide means attached to said end rails and shiftably engaging said top and bottom rails, and connecting links engaging with said end rails to be shifted therewith and slidingly engaging with said filler through said openings, whereby said end rails may be shifted to and from said filler within the range determined by the lengths of said openings, said connecting links comprising overlapping spaced apart members joined through said openings and extending on front and back sides of the filler to their engagement with the end rails, said members of each link consisting of a metallic bar, the free ends of which are secured to said end rails.

6. In an adjustable grille, top and bottom rails, a filler fixed in dimensions and having a plurality of openings at least at each end, said filler being engaged along its top and bottom edges in a fixed manner by said top and bottom rails, a rail at each end of said filler, guide means attached to said end rails and shiftably engaging said top and bottom rails, and connecting links engaging with said end rails to be shifted therewith and slidingly engaging with said filler through said openings, whereby said end rails may be shifted to and from said filler within the range determined by the lengths of said openings, said connecting links comprising overlapping spaced apart members joined through said openings and extending on front and back sides of the filler to their engagement with the end rails, said end rails having a flange and the free ends of said links being secured across said flange in fixed positions relative to the end rails.

JOHN F. FARMER.